6 23 0 79

United States Patent

[11] 3,622,989

[72] Inventor Earl R. Dowdy, Sr.
Dallas, Tex.

[21] Appl. No. 880,712
[22] Filed Nov. 28, 1969
[45] Patented Nov. 23, 1971
[73] Assignee Carter Craft, Inc.
Plano, Tex.

[54] FINGERPRINT IDENTIFICATION
5 Claims, 3 Drawing Figs.

[52] U.S. Cl. 340/146.3E
[51] Int. Cl. G06k 9/12
[50] Field of Search 340/146.3, 149 A; 235/61.11

[56] References Cited

UNITED STATES PATENTS

| | | | |
|---|---|---|---|
| 3,050,711 | 8/1962 | Harmon | 340/146.3 |
| 3,106,699 | 10/1963 | Kamentsky | 340/146.3 X |
| 3,108,254 | 10/1963 | Dimond | 340/146.3 |
| 3,192,505 | 6/1965 | Rosenblatt | 340/146.3 |
| 3,231,861 | 1/1966 | French | 340/149 |
| 2,964,734 | 12/1960 | West | 340/146.3 Z |

*Primary Examiner*—Maynard R. Wilbur
*Assistant Examiner*—Leo H. Boudreau
*Attorney*—Richards, Harris & Hubbard

ABSTRACT: This invention relates to the identification of fingerprints automatically, and more particularly to a system in which conductive contact is made between a finger surface and an array of electrodes with circuit means for dividing the electrodes into groups and logic means for control of the response of the system to predetermined combinations of signals from the electrodes.

INVENTOR

EARL R. DOWDY, SR.

Richards, Harris & Hubbard
ATTORNEY

FINGERPRINT IDENTIFICATION

BACKGROUND OF THE DISCLOSURE

Automatic detection or sensing of identity in dependence upon fingerprint patterns has long been a goal which has not been satisfied. This is because of the complex nature of the character of fingerprint patterns and the necessity for providing an analysis thereof in detail adequate to distinguish one pattern from another.

SUMMARY OF INVENTION CLAIMED

The present invention is directed to a system in which a sampling of the fingerprint pattern is obtained at a plurality of points with a logic system responsive to a predetermined number of signals from each of a plurality of sets of signals before an identifying response from the system is generated.

The invention may facilitate control of security areas wherein access may be permitted only by providing a person with a printed or otherwise recorded code that can be compared with a response, through use of the present invention, to the same person's fingerprint pattern so that only upon coincidence of two responses, one to the recorded code and one to the fingerprint pattern, can identity be satisfied as to permit access to the restricted area.

BRIEF DESCRIPTION OF THE DRAWINGS

For a more complete understanding of the present invention and for further objects and advantages thereof, reference may now be had to the following description taken in conjunction with the accompanying drawings in which.

DESCRIPTION OF A PREFERRED EMBODIMENT

Figure 1:
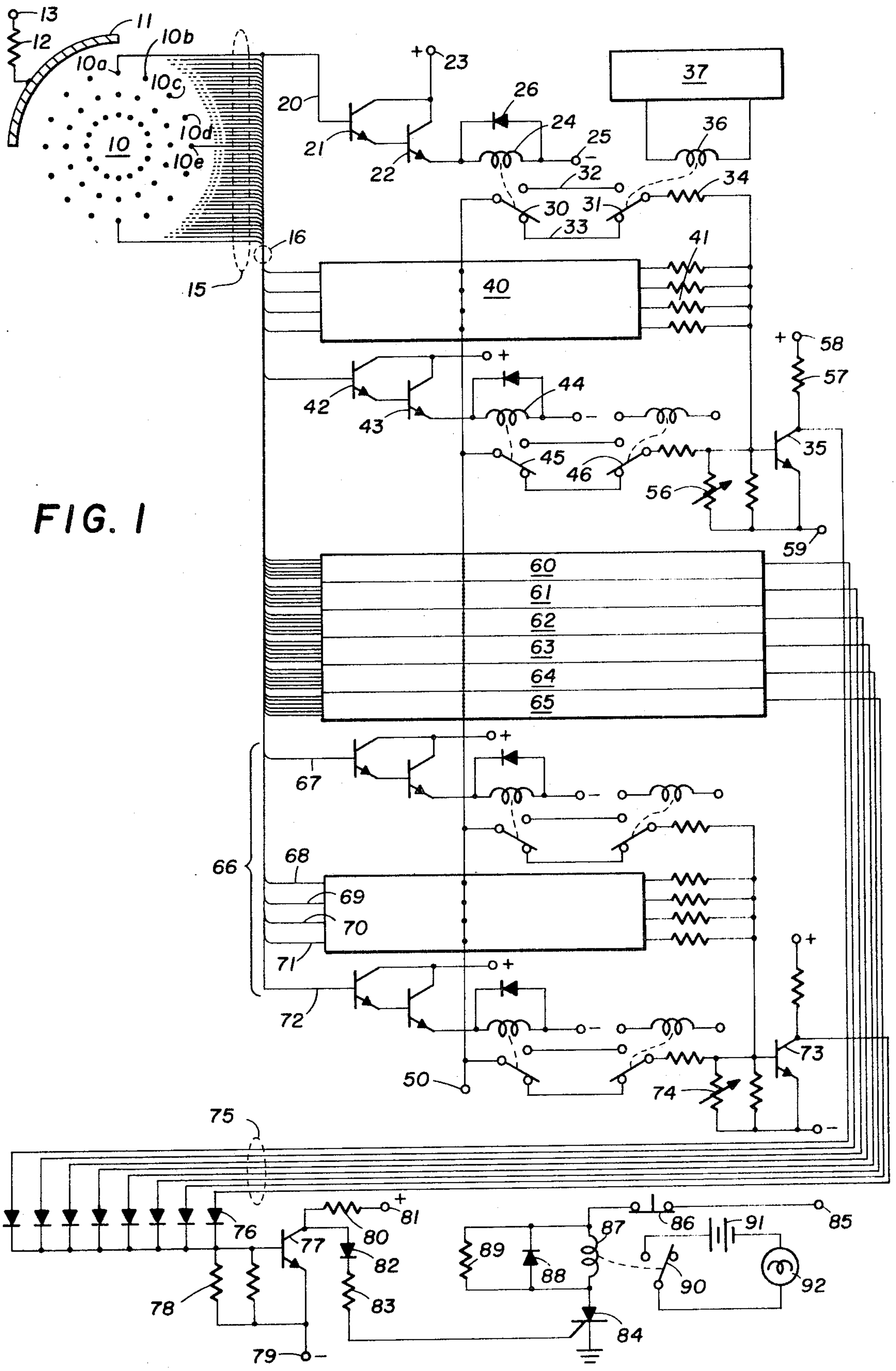
FIG. 1 is a schematic diagram illustrating one embodiment of the invention.

Referring now to FIG. 1, there is illustrated a fingerprint identification system in which an array 10 of electrodes is provided for contact by a finger. A contact or orienting bar 11 of electrically conductive material is mounted adjacent to the array 10. The bar 11 is connected by way of resistor 12 to the terminal 13 of a +17-volt source. By placing a finger in contact with bar 11 and pressing the finger surface onto the array 10, the ridges at which contact is made between the finger and the electrodes will serve to permit current flow by way of conductors 15 to a sensing system. While only three electrodes 15 are shown with their connections extending from the array 10, it will be understood that there is a separate circuit leading from each of the terminals to a cable 16.

The invention will be described in connection with a particular embodiment, understanding that modifications will suggest themselves. In the present example, each terminal, such as terminal 10*a*, is connected as by way of a conductor 20 to the base of an amplifying transistor 21 whose emitter is connected to the base of the second transistor 22. The collectors of transistors 21, 22 are connected to terminal 23, a +13.5-volt supply terminal for the transistors 21 and 22. The emitter of transistor 22 is connected to a relay coil 24 and then to a zero voltage supply terminal 25.

A diode 26 is connected across the coil 24. The coil 24 serves, when energized, to actuate a switch 30 which is connected in series with a second switch 31. Conductor 32 interconnects two of the terminal switches 30 and 31 and conductor 33 connects the other circuits of switches 30 and 31. Switch 31 is connected by way of a resistor 34 to a base of a transistor 35.

A relay coil 36 is connected to the output of a card reader 37. The relay coil 36 controls switch 31. Card reader 37 is provided to receive a card or other record which bears a code corresponding with a given fingerprint. If, in that fingerprint a circuit is completed between bar 11 and terminal 10*a*, then relay switch 30 would be actuated by coil 24 to connect it to conductor 32. Similarly, the card employed in the unit 37 would be coded as to actuate the relay coil 36 to connect the arm of switch 31 to conductor 32. By this means, the coincidence between the character of the fingerprint placed on the sensor pattern 10 and the code on the card in reader 37 permits current to flow through resistor 34 to the base of transistor 35.

Four other electrodes, such as electrodes 106, 10*c*, and 10*d*, are each connected through identical circuits in unit 40 and resistors 41 to the base of transistor 35. The sixth terminal 10*e* is connected by way of transistors 42, 43 and relay coil 44 to control a switch 45 which is in series with a switch 46 leading to the base of transistor 35. Thus, six of the contacts in the array 10 serve as control inputs for transistor 35. Terminal 50 is connected to a current source common to all of the circuits leading to the base of transistor 35. Transistor 35 is provided with an adjustable biasing resistor 56. The collector is connected by way of resistor 57 to a terminal 58, an 11-volt regulated current supply. The emitter is connected to the zero voltage terminal 59, common to the biasing resistor 56.

The resistance 56 which serves to control conduction in the transistor 35 is made adjustable so that the transistor 35 will be rendered conductive when a predetermined number of the circuits connected thereto are energized. It has been found to be most desirable to divide the pattern 10 up into subgroups of six to 10 contacts per group. In the array shown in FIG. 1, there are 48 electrodes. In the example here shown, the array of 48 electrodes is separated into eight groups of six electrodes per group. In such case, resistor 56 preferably is adjusted so that transistor 35 will be conductive when current flows through any five of the six electrodes associated therewith.

The other groups of electrodes are connected by way of circuit groups 60, 61, 62, 63, 64, 65 and 66. The circuit groups 60–66 are the same as the circuit groups connected to electrodes 10*a*–10*e*. Each of the circuit groups 60–66 has an output transistor corresponding with transistor 35. More particularly, group 66 has been shown in detail with the six input lines 67, 68, 69, 70, 71 and 72 leading to control circuits which serve to apply current to the base of the output transistor 73. The firing point of transistor 73 is 13.5the adjustable bias resistor 74 which is adjusted so that transistor 73 will conduct when five of the six lines 67–72 are energized. Transistor 73 will not conduct if less than five of the lines 67–72 are 11

Current from the output transistors 35, 73 of the eight circuit groups are connected by way of channels 75 and a set of diodes 76 to the base of a transistor 77. Transistor 77 is provided with a biasing circuit 78 in which the emitter is common, being connected to a zero volt terminal 79. The emitter is connected by way of resistor 80 to the +13.5-volt supply terminal 81. The emitter is also connected by way of diode 82 and resistor 83 to the trigger input of a silicon-controlled rectifier (SCR) 84. SCR 84 is connected in a series circuit having a +11-volt supply terminal 85. The series circuit includes a switch 86 and a relay coil 87. The coil 87 is connected in parallel with a diode 88 and a resistor 89. The coil 87 serves to control a switch 90 which is connected in series with a source 91 and an indicator lamp 92.

The operation of the transistor 77 is such that all of the lines 75 must be energized before transistor 77 will be actuated to trigger the unit 84.

Thus, the invention involves control of the conduction point for the output transistors 35, 73, so that they will conduct when a predetermined number, less than all, of the electrodes in the array 10 are conductive. They then serve to control transistor 77 by way of diodes 76 which effectively form and AND gate so that all of the lines 75 must be satisfied before the unit 84 is triggered to turn on the indicator lamp.

It will be appreciated that variations in this pattern of control may be employed depending upon the nature and the degree to which the identity must be verified. More points may be used in the pattern 10. The groupings may be changed, but the operation will be retained so that, for any selected group, only a given percentage (less than all) of the circuits will be actuated to control an output circuit all of whose input lines have to be actuated.

Lamp 92 is representative of output indicators or controls. For example, the lamp 92 may be replaced with a latch on a gate which will be opened only when the prescribed conditions of the identification circuit are satisfied.

Figures 2, 3:
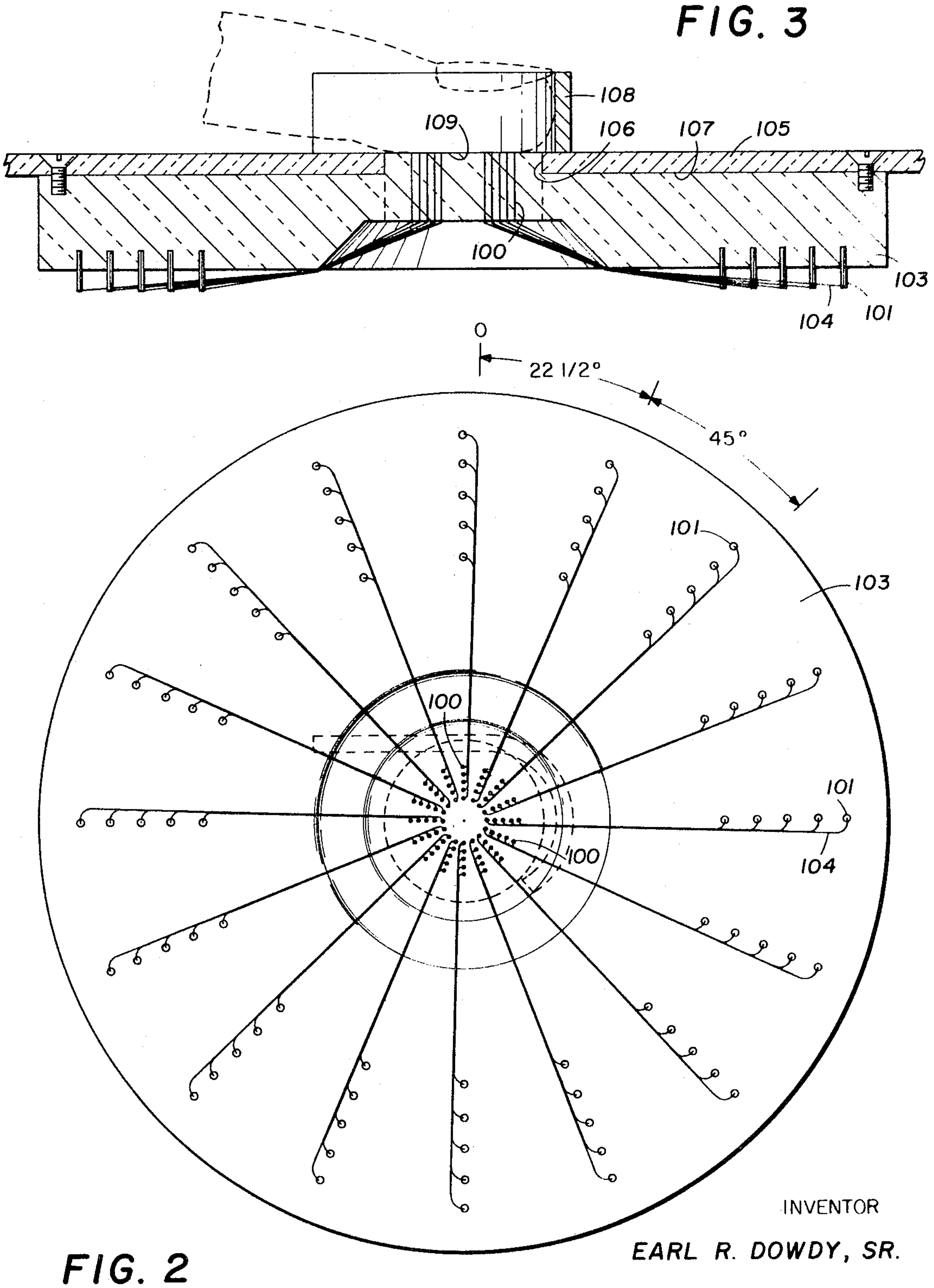
FIG. 2 is a bottom view of one embodiment of a sensing head.
FIG. 3 is a sectional view taken along lines 3—3 of FIG. 2.

FIG. 2 is a bottom view of one embodiment of the sensing head wherein there is a central array of electrodes. The electrodes are radially oriented at 22½° intervals and arranged in five circles of progressively increasing diameter. A separate conductor extends from each of the electrodes to an output terminal post. More particularly, a conductor extends from the electrode 100 on the outer ring, at a 90° angle, to a terminal post 101 out on the periphery of the casting on which the electrodes 100 and the terminal post 101 are supported. The array shown in FIG. 2 thus differs from the array 10 of FIG. 1 in that it comprises 80 electrodes arranged in five circles of 16 electrodes per group whereas in FIG. 1, there were three circles of 16 electrodes per group.

The unit of FIG. 2 is shown in a sectional view of FIG. 3 where the post 101 is embedded in the bottom surface of a plastic or electrically insulating casting 103. The conductor 104 extends from post 101 to the electrode 100. In this embodiment of the invention, the electrode 100 and the companion electrode were oriented in circular arrays wherein the inner circle was 0.042 inch in diameter with the diameter of the succeeding circles increasing by 0.021 inch each. The electrodes were made of copper wire size 57 AWG.

In FIG. 3, the casting is shown secured to a surface plate 105 also of insulating material and forming part of the case in which the system is housed. The central portion 106 forms an island which extends above the surface 107 and is coplanar with the surface of plate 105. Contact bar 108 is positioned on top of the plate 105 and serves not only to provide an electrical contact to the finger being tested, but also to control orientation of the pattern and thus provide some measure of uniformity in successive tests.

In the embodiment of the invention here shown, the body 103 was cast from a suitable high-resistance plastic with the center plug corresponding in diameter to the island 106 being cast with the wires of 52 gauge being tensioned and secured in a pattern with the wires parallel to the axis of island 106. The conductors forming the electrodes were thus cast in place. The upper surface 109 was then lapped or polished to provide for contact between the electrodes and the finger surface. In use it was found that in order to produce the most reproducible results, it was desirable to precondition the finger by wiping it dry, substantially free from moisture.

Variations in the reproducibility of the results from use of the system are affected by varying the number of circuits required to be conductive in each of the groups shown in FIG. 1. More exact positioning of the finger is required for a given level of reproducibility if transistor 35, for example, will not fire until all the electrodes in the related pattern are in contact with the finger. A less exact positioning is required if only four of each group of six electrodes are required to be in contact with the finger. Thus, depending upon the requirements of the particular application of the system the criteria for establishing identity between a given pattern and the code on the card in the reader 37 can be selected.

From the foregoing, it will be seen that the present invention provides for fingerprint sensing where a surface array of electrodes is adapted for contact by a finger surface. A primary circuit extends from each of the electrodes with each primary circuit having a current source and a secondary circuit closure means, each such closure means being operable in response to a predetermined current flow between one of the electrodes and the finger surface. A summing means in a secondary circuit produces a secondary output current for each of a plurality of sets of primary circuits. A second summing means is provided for combining the output currents from all of the first summing means and includes logic means to be responsive only when output current flows from all of the sets. Threshold means is provided in each of the secondary circuits to control the current flow in the output of the summing means therein.

Having described the invention in connection with certain specific embodiments thereof, it is to be understood that further modifications may now suggest themselves to those skilled in the art and it is intended to cover such modifications as fall within the scope of the appended claims.

I claim:

1. A fingerprint sensing system which comprises:

1. a surface array of electrodes adapted for contact by a finger surface,
b. a primary circuit extending from each of said electrodes with each primary circuit having a current source and a secondary circuit closure means each operable in response to predetermined current flow between one of said electrodes and said surface,
c. first summing means in said secondary circuit for producing a secondary output current for each of a plurality of sets of said primary circuits,
d. second summing means for combining output currents from all said first summing means, and
e. threshold means for each said summing means to control current flow in the output of said second summing means.

2. A fingerprint pattern detector comprising:

a. a planar array of surface electrodes adapted for contact by a digit,
b. threshold circuits, one leading from each said electrode,
c. a plurality of summing circuits in number much less than the number of said electrodes and each connected to a plurality of said threshold circuits each to produce an output signal when a predetermined fraction of the threshold circuits connected thereto are actuated above its threshold by contact with said digit, and
d. a single summing circuit connected to all said plurality of summing circuits to produce an identification signal when all said output signals are present.

3. The combination set forth in claim 2 wherein each said threshold circuit includes a standard ANDed with the circuit leading from said electrodes.

4. The combination set forth in claim 2 wherein each threshold circuit includes and AND circuit having one input leading from said electrode and a card reader leading to the other input of said AND circuit.

5. The combination set forth in claim 2 wherein said array comprises a plurality of electrodes surfaced in an insulator at equally spaced points on a plurality of concentric circles.

* * * * *

PO-1050
(5/69)

UNITED STATES PATENT OFFICE
CERTIFICATE OF CORRECTION

Patent No. 3,622,989 Dated Nov. 23, 1971

Inventor(s) Earl R. Dowdy, Sr.

It is certified that error appears in the above-identified patent and that said Letters Patent are hereby corrected as shown below:

Address for Assignee listed as "Piano, Texas" should be --Plano, Texas--.
Col 2, line 10, "electrodes 106" should be --electrodes 10b--;
line 43, "13.5the" should be --controlled by the--;
line 46, "11" should be --conducting.--;
line 69, "and" should be --an--.
Col 3, line 11, "22 1/2°" should be --22 1/2°--.
Col 4, line 25, "1." should be --a.--;
line 56, "and AND" should be --an AND--.

Signed and sealed this 11th day of July 1972.

(SEAL)
Attest:

EDWARD M.FLETCHER,JR.
Attesting Officer

ROBERT GOTTSCHALK
Commissioner of Patents